United States Patent [19]

O'Meara

[11] 4,102,572

[45] Jul. 25, 1978

[54] DUAL-WAVELENGTH COHERENT OPTICAL ADAPTIVE SYSTEMS

[75] Inventor: Thomas R. O'Meara, Malibu, Calif.

[73] Assignee: Hughes Aircraft Company, Culver City, Calif.

[21] Appl. No.: 823,815

[22] Filed: Aug. 11, 1977

[51] Int. Cl.² .................... G01C 3/08; H01S 3/00
[52] U.S. Cl. ............................. 356/5; 250/199; 332/7.51; 356/152; 331/DIG. 1
[58] Field of Search ............ 356/5, 152; 332/7.51; 250/199; 331/94.5 A

[56] References Cited

U.S. PATENT DOCUMENTS

| | | | |
|---|---|---|---|
| 3,346,738 | 10/1967 | Rogers et al. | 250/203 R |
| 3,514,776 | 5/1970 | Mulready | 343/6 R |
| 3,727,223 | 4/1973 | O'Meara | 250/199 |
| 3,731,103 | 5/1973 | O'Meara | 356/5 |
| 3,764,213 | 10/1973 | O'Meara | 356/5 |
| 3,825,845 | 7/1974 | Angelbeck et al. | 332/7.51 |
| 3,849,742 | 11/1974 | Hughes et al. | 250/199 |
| 4,063,819 | 12/1977 | Hayes | 356/152 |

OTHER PUBLICATIONS

Pearson; Optical Engineering, vol. 15, No. 2, Mar.–Apr. 1976; pp. 151–157, 356–365.

*Primary Examiner*—S. C. Buczinski
*Attorney, Agent, or Firm*—Lawrence V. Link, Jr.; W. H. MacAllister

[57] ABSTRACT

Dual-wavelength coherent optical adaptive systems which comprises means for adaptively forming a first beam of a first wavelength, on a target and for deriving therefrom information defining characteristics of phase perturbations in the propagation path to the target; and means responsive to said information for compensating for propagation path distortions for a second beam of a second wavelength which is simultaneously transmitted along a substantially identical path to that of said first beam.

15 Claims, 7 Drawing Figures

DUAL-WAVELENGTH COHERENT OPTICAL ADAPTIVE SYSTEMS

BACKGROUND OF THE INVENTION

This invention relates generally to coherent adaptive optical systems and more particularly to such systems wherein a first electro-magnetic beam measures phase characteristics or optical path differences of a propagation path and said measured characteristics are used to compensate a second electro-magnetic beam.

My U.S. Pat. No. 3,731,103 discloses a laser system wherein adaptive phase control is used to establish an in-phase condition for transmitted energy at a remotely located target. In accordance with one embodiment of the invention of said patent, a plurality of subaperture areas of the transmitted beam are phase modulated at distinctive modulation (tagging or dither) frequencies. Due to interaction of the energy from the various subapertures, amplitude modulation components at the tagging frequencies in the received energy are indicative of phase distortions across the beam. The system adjusts the relative phase of the subaperture transmission channels to minimize the modulation components in the received energy and thereby establishes an in-phase condition, at the target, of the energy across the transmitted beam.

The adaptive array system disclosed in my U.S. Pat. No. 3,764,213 spatially modulates a received beam by phase modulating subaperture segments of the received beam at respective modulation (tagging) frequencies. The resultant signal is applied through the aperture of an image stop structure to a detector and the detector's output contains modulation components at the tagging frequencies of the respective subapertures. The degree of modulation at a given tagging frequency is indicative of the phase imbalance associated with the respective subaperture channel. By adjusting the relative phasing of the subaperture receiving channels so as to minimize the amplitude modulation components in the detector's output signal, the received beam is adjusted to approach an in-phase condition. The phase adjustment of the subaperture channels, which is set during the received portion of the operation of the system, is held during a subsequent transmission period. In this manner, the transmission beam which time shares the subaperture channels with the receiving beam is compensated so as to deliver in-phase energy to the target.

The subject invention builds upon the technology of my two cited patents so as to produce a new and useful dual-wavelength system that provides the hereinbelow set forth benefits and advantages.

SUMMARY OF THE INVENTION

One object of the subject invention is to provide an improved high power coherent optical adaptive system which implements continuous phase compensation.

Another object of the subject invention is to provide a coherent optical adaptive phase compensation system which avoids problems that arise in prior pulsed "multi-dither" adaptive systems.

A further object of the invention is to provide a coherent optical adaptive system which can readily accomodate energy pulses of any pulse width or repetition frequency.

Yet another object of the invention is to provide an improved coherent optical adaptive system which readily implements "ghost-beam" offset techniques whereby the main beam, for example, a high powered beam may be offset from a reference beam which measures the phase compensation required by the main beam.

Still a further object is to provide an improved coherent optical adaptive system which avoids problems associated with parasitic amplitude modulation on the main beam due to random noise modulation in certain type prior adaptive systems.

In accordance with one preferred embodiment of the subject invention, energy from a high power laser device at a first wavelength $\lambda_1$ is transmitted by means of a "slaved" high power phase corrector mirror, a cooled diffraction-grating beam separator and a cooled relay mirror. A low power laser at a wavelength $\lambda_2$ is transmitted from a coherent optical adaptive subsystem similar to that disclosed in my U.S. Pat. No. 3,731,103, is then reflected from said diffraction-grating beam separator and said relay mirror and is transmitted along an output path which is substantially identical to that of said high power laser beam. The coherent optical adaptive subsystem includes a low power corrector mirror which is controlled in a "closed loop" manner in accordance with the teachings of my just cited patent i.e. the return energy at frequency $\lambda_2$ is processed to adjust the relative phasing across the low power corrector mirror so as to cause the energy in the $\lambda_2$ beam to be substantially in phase at the target. Both the high power and the low power corrector mirrors comprise segments which are positioned in response to respective control signals. In this way the relative phase of the various subaperture segments or channels is selectable. The signals developed in the closed loop system to correct for the phase perturbations encountered by the low power beam are applied in an "open loop" manner to the corrector mirror in the high power $\lambda_1$ channel.

It is noted that the propagation path distortion measurement and the correction therefor is a continuous process not affected by the pulse width of the high power transmission channel nor by its pulse repetition frequency. Further, in accordance with the invention, the phase modulation index of the coherent optical adaptive subsystem may be selected to optimize the measurement process without regard to problems resulting from parasitic amplitude modulation in the phase modulated beam, i.e. modulation on the low power beam is acceptable whereas such modulation on the high power beam may not be. Further, in accordance with the invention, the high power laser energy at frequency $\lambda_1$ may contain appreciable amplitude modulation at frequencies within the "dither" bandwidth without inducing extraneous signals in the output of the system's optical detector.

In accordance with a second preferred embodiment of the invention, which is particularly advantageous when wavelengths $\lambda_1$ and $\lambda_2$ are sufficiently close to one another and/or the path length errors are nondispersive, a single corrector mirror is located in the path common to the low and high powered beams. In this embodiment the coherent optical adaptive subassembly controls the single high power corrector mirror to cause the low power beam to be in phase at the target. This control of the corrector mirror, in response to the received signals at wavelength $\lambda_2$, also adjusts the phase of the high power beam to compensate for the phase perturbations it will encounter on the way to the target.

A third embodiment of the invention utilizes a low power illumination source, or a naturally present illumination source, which need not share a common path to the target with the high power beam. In accordance with this embodiment the low power laser energy is reflected from the target along a path contiguous to the high power beam and is then processed by a coherent optical adaptive subsystem which corrects phase distortion across the low power received beam by techniques similar to those of my U.S. Pat. No. 3,764,213. The corrector mirror which is used to remove the phase distortion from the low powered beam is in a path common to that of the high power beam and therefore the high power beam is also corrected for the atmospheric phase disturbances. It is noted that this third embodiment of the invention is also adapted for responding to energy received from a radiating target.

All of the embodiments of the invention lend themselves to "ghost-beam" operation wherein a low power beam locks onto and tracks a reference such as a small point source target, a highlight on an extended source, or "a glint" (small highly reflective point on a larger target) and the high power beam is offset therefrom by a small amount. Achieving ghost-beam operation with any embodiment of the subject invention only requires the addition of a microslewing or microtilting mirror between the high power laser and the beam separator. This additional mirror may be positioned to change the incident angle of the high power beam by a small angle. Ghost-beam offset operating in the system of the invention is an excellent way of accomplishing aim point offset since it continuously monitors and corrects for propagation paths changes, if the offset is held small, and does not introduce transients into the system.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DESCRIPTION OF THE PREFERRED EMBODIMENTS

Figure 1:
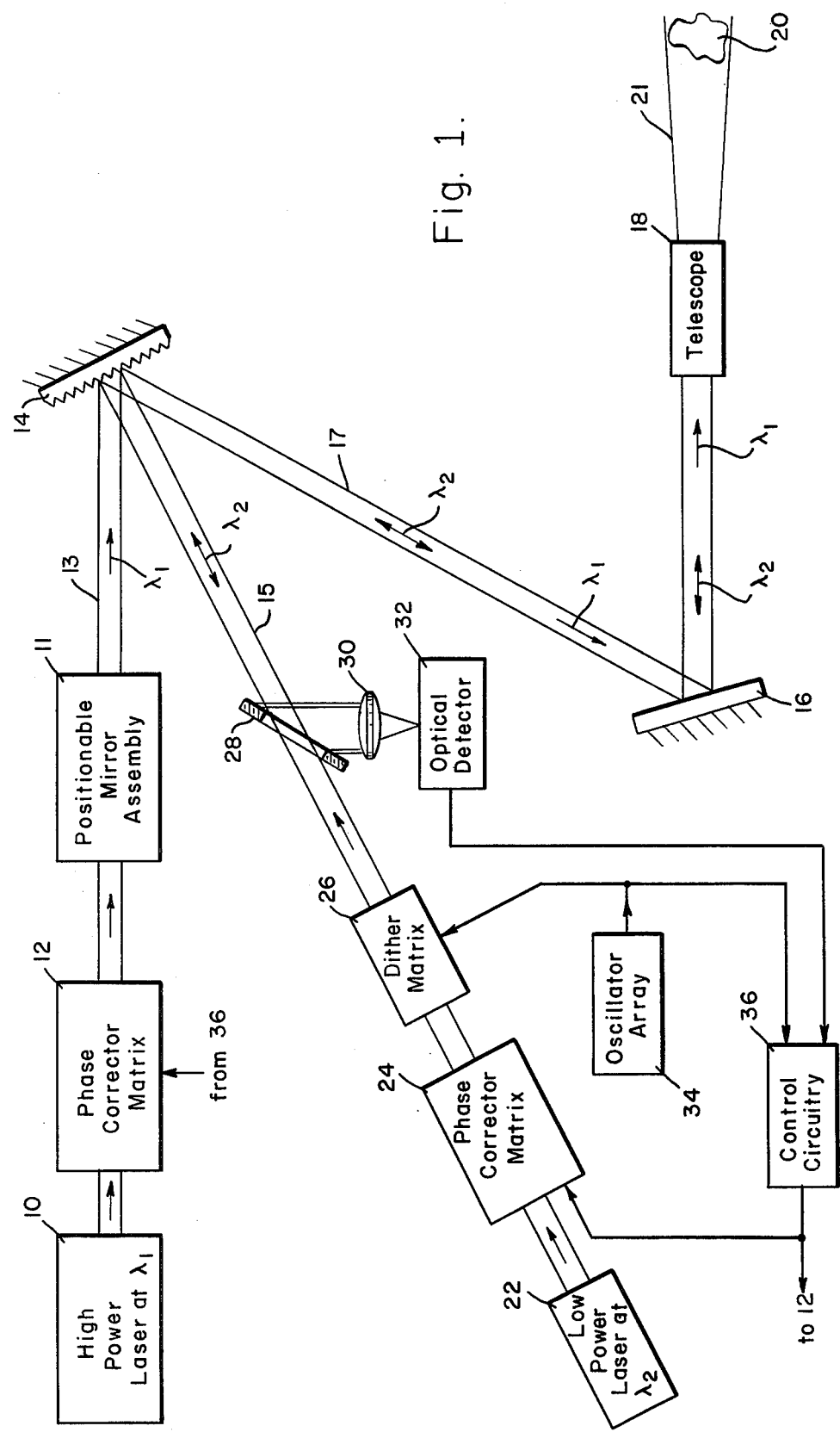
FIG. 1 is a block diagram of one preferred embodiment of a dual-wavelength coherent optical adaptive system in accordance with the subject invention.

Considering first the dual-wavelength coherent optical adaptive system shown in FIG. 1, a high power beam of energy at a wavelength $\lambda_1$ from laser unit 10 is processed by corrector matrix assembly 12, positionable mirror assembly 11 and diffraction-grating beam separator 14. The energy reflected from grating 14 is next reflected from a relay mirror 16 and is then transmitted through telescope 18 to a target 20.

The energy at wavelength $\lambda_2$ from a low power laser unit 22 is applied through a phase correction matrix 24, a dither matrix 26, and a beam splitter 28 to grating 14. The wavelengths $\lambda_1$ and $\lambda_2$ and the parameters of grating 14 are selected such that both beams are reflected from grating 14 to relay mirror 16 along the same (or a contiguous) path 22.

A portion of the energy reflected from target 20 is received by telescope 18 and is reflected from relay mirror 16 to grating 14. Grating 14 reflects received energy at wavelength $\lambda_1$ along the upper path 13 and it is naturally dissipated therein. The received energy at frequency $\lambda_2$ is transmitted along the central path 15 and is routed by annular shearing mirror 28 to a lens 30 which focuses the energy and applies it to an optical detector 32.

As discussed in detail in my U.S. Pat. No. 3,731,103, an array of oscillators 34 control respective ones of an array of electrically controllable phase shifters (ECPS) which comprise dither matrix 26. AS a result of the phase modulation impressed upon the energy transmitted at wavelength $\lambda_2$ by dither matrix 26, the out of phase conditions at target 20 are characterized by amplitude modulation signal components in the received energy at wavelength $\lambda_2$ applied to detector 32. The theory as to why the amplitude modulation signal components are indicative of an out of phase condition across the transmitted $\lambda_2$ beam at the target is presented in my just cited patent.

The output signal from optical detector 32 is applied to a control circuitry unit 36 which provides the control signals to phase corrector matrix 24. These control signals cause the relative phase across the $\lambda_2$ beam at the target to be substantially in phase, i.e. unit 36 adjusts the relative phase across the $\lambda_2$ beam so that the amplitude modulation signal components from detector 32 are minimized.

The output signals from control circuitry 36 are also applied to phase corrector matrix 12, so as to adjust the phase of the respective subaperture channels of the beam at wavelength $\lambda_1$. The corresponding subaperture channels for the $\lambda_1$ and $\lambda_2$ beams are controlled by the same control signal, e.g. subaperture channels of the two beams which are coincidence with one another in the common path segment are controlled by the same control signal. Hence the coherent optical adaptive subsystem which includes units 22, 24, 26, 28, 30, 32, 34, and 36 of the embodiment of FIG. 1, adaptively forms a beam at wavelength $\lambda_2$ on the target and adjusts the relative phase shift across said beam such that the energy thereof is in phase at the target. This phase adjustment of beam $\lambda_2$ produces information which characterizes the propagation path i.e. defines any atmospheric phase imbalances therein, for the signal at the wavelength $\lambda_1$ as well as for the $\lambda_2$ beam. Said information permits correction of the propagation errors in beam $\lambda_1$ by means of "open loop" control of "slaved" phase corrector matrix 12. Phase corrector matrix 24 is controlled as part of the "closed loop" operation of the coherent optical adaptive subsystem and the output signals produced by the subsystem also control phase corrector matrix 12. Hence the beams at wavelengths $\lambda_1$ and $\lambda_2$ has a phase temporal sequence impressed thereon which is the phase conjugate of the phase temporal sequence encountered in the propagation path to the target.

Figure 2:
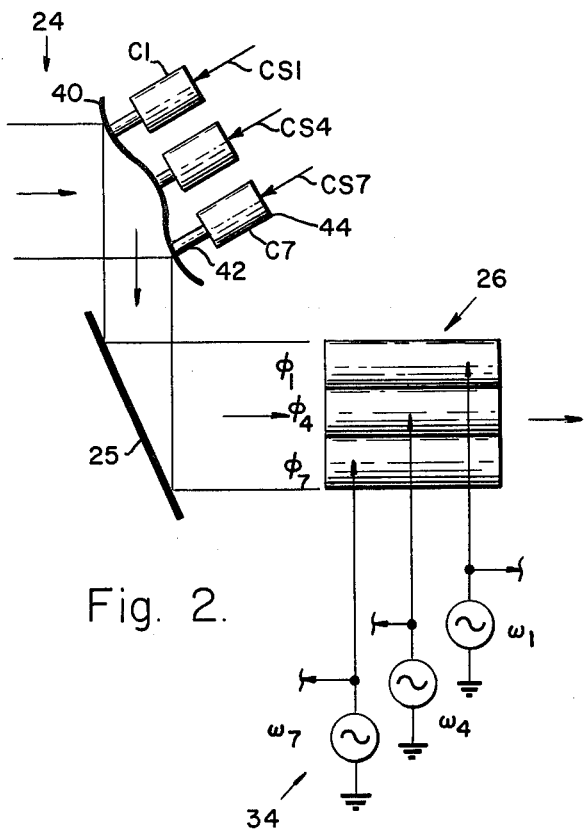
FIG. 2 shows in greater detail the phase corrector and the "dither" matrix units of FIG. 1.
Figure 3:
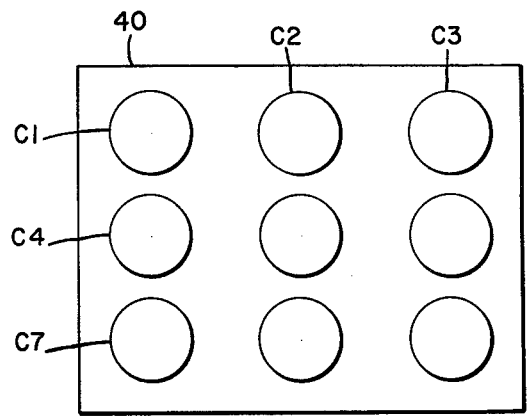
FIG. 3 is a rear plan view of a corrector mirror suitable for use in the embodiment of FIG. 1.

One phase corrector matrix suitable for implementation of element 24 in FIG. 1 is shown in FIG. 8 of my U.S. Pat. No. 3,967,899, and is shown schematically in FIGS. 2 and 3 hereof. Referring now primarily to FIGS. 2 and 3, as there shown, phase corrector matrix 24 comprises a continuous metallic or glass sheet 40 having a highly polished, highly reflective surface attached at regular intervals to glass or ceramic members 42 which in turn are attached to one end of piezoelectric activators 44. Activators 44 position members 42 and hence sheet 40 in response to control signals applied from control circuitry 36, e.g. signals CS1, CS4 and CD7 of FIG. 5. The phase corrector matrix 12 of FIG. 1 may be similar to the just described matrix 24.

It is noted that the phase corrector matrix in FIG. 3 is only a 3 × 3 matrix comprising 9 activators designated C1 through C9. This simple example is selected to avoid unnecessary complexity of the drawings and it should be understood that a great number of subaperture channels may be implemented. The activators C1 through C9 provide localized displacement of sheet 40 as a function of the respective applied control signals CS1 through CS9. The continuity of mirrored surface 40 provides a smoothly varying spatial phase function which is normally desired for the type of system illustrated in FIG. 1. This is due to the fact that atmospheric nonuniformities, for exmple, are more likely to be smooth varying functions than step functions. However, it is noted that if desired, the smooth surface 40 may be replaced by discrete area mirrors associated with each of the activators whereby the phase correction imposed by each phase shifter varies stepwise across matrix 24.

Figure 4:
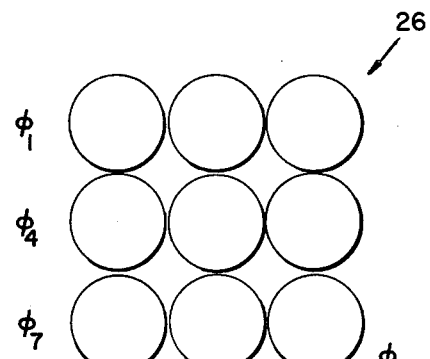
FIG. 4 is a front plan view of the "dither" matrix unit shown in FIG. 1.

As shown in FIG. 4, for each subaperture channel, as defined by the activators of phase corrector matrix 24, there is a corresponding electronically controllable phase shifter ($\phi$) of dither matrix 26 (see FIG. 4). As shown in FIG. 2, for a single column of the matrix of FIG. 4, each phase shifter is controlled by an associated oscillator and in response thereto phase modulates the energy of the associated subaperture channel at the frequency of the oscillator. For example, the modulation (tagging) frequency impressed upon the energy processed by phase shifter $\phi_1$ is $\omega_1$; and the tagging frequency applied by phase shifter $\phi_4$ is $\omega_4$.

Figure 5:
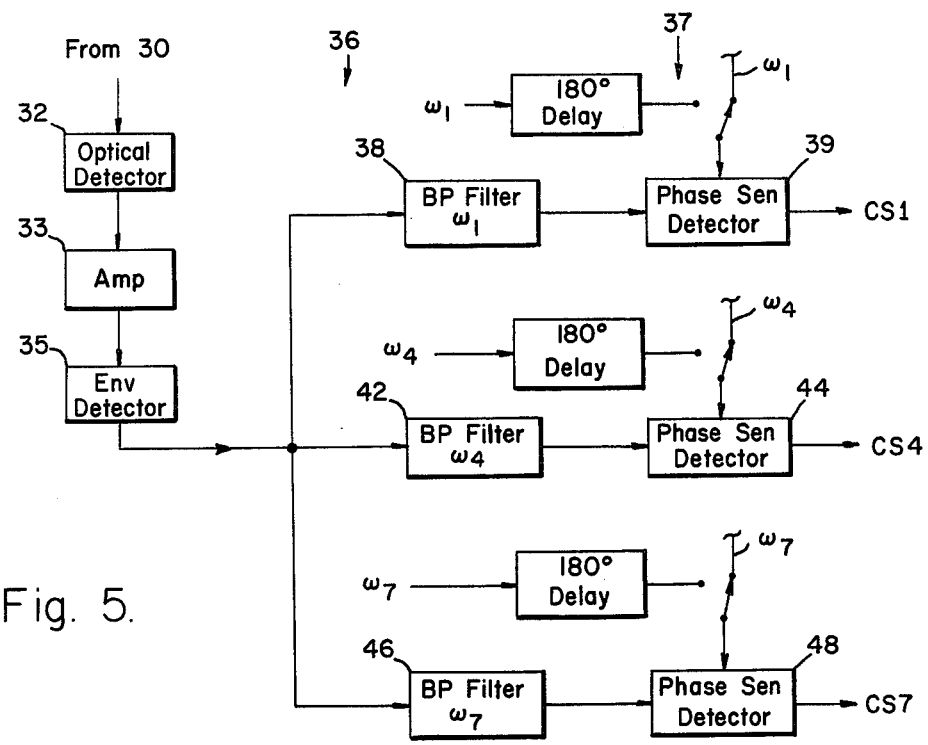
FIG. 5 is a block diagram which shows the control circuitry of FIG. 1 in greater detail.

The control signals for phase corrector matrix 24 are supplied by control circuitry unit 36 of FIG. 1 which is shown in greater detail in FIG. 5. As there shown, the output signals from detector 32 are amplified within amplifier unit 33 and then detected by envelope detector 35. As mentioned previously the amplitude modulation components in the output signal from the envelope detector are indicative of the phase unbalance at the target of the energy transmitted through the subaperture channel having the corresponding tagging frequency (such as $\omega_1$ to $\omega_9$). For example, amplitude modulation components at the tagging frequency $\omega_1$ are passed by the bandpass filter 38 and are applied to phase sensitive detector 39. The output signal from phase sensitive detector 39 has the amplitude A sin $\theta$ where A is a function of the magnitude of the signal applied from filter 38 and $\theta$ is the phase angle between the last mentioned signal and the reference signal applied to phase detector 39.

The system of the invention also allows selection of special tracking modes, that is, glint or black hole tracking. With control signals of one polarity, the coherent optical adaptive subsystem adjusts the phase corrector matrix such that the $\lambda_2$ beam forms on a glint (a small highly reflectivity area on an extended target); then with the opposite polarity of control signals the beam will form on a small area of low reflectivity. This latter operation is sometimes referred to as "black hole" tracking. The change in the polarity of the control signals and hence the selection of "glint" or "black hole" tracking may be implemented by switching circuit 37 which allows an 180° phase delay to be switched in series which each of the reference signals prior to their application to the phase sensitive detectors. Alternatively, the output signals from each of the phase sensitive detectors may be processed through a polarity inverting circuit (not shown) to select the second tracking mode.

Figure 6:
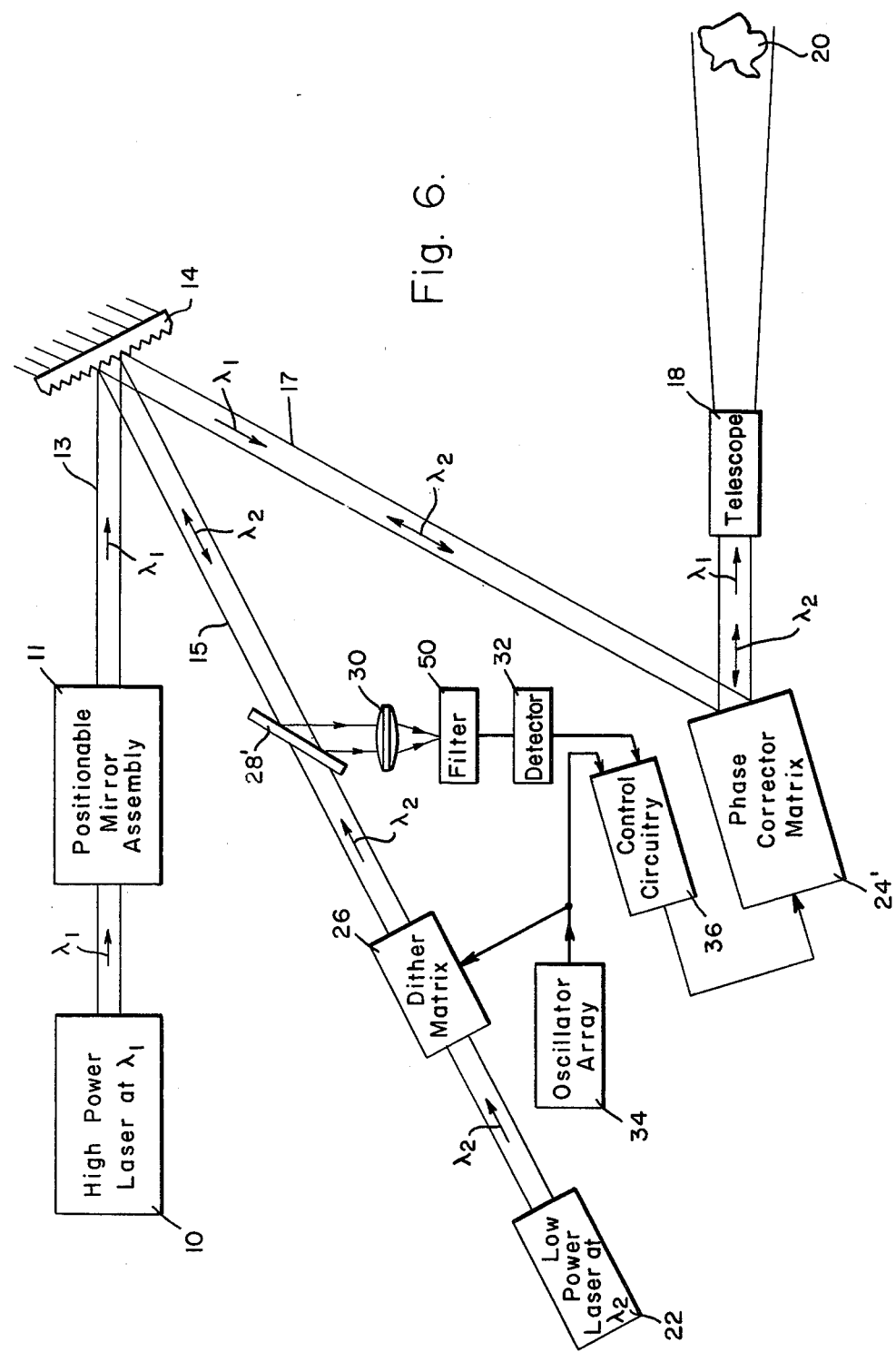
FIG. 6 is a block diagram of a dual-wavelength coherent optical adaptive system in accordance with the invention wherein a single phase corrector matrix element is employed in a path common to the high and low power beams.

Reference is now primarily directed to FIG. 6 which depicts a second embodiment of a dual-wavelength coherent optical adaptive system in accordance with the invention. As there shown a single phase corrector mirror element 24' is employed in the path common to both the $\lambda_1$ and $\lambda_2$ beams. In particular it is noted that the phase corrector matrix 12 shown in FIG. 1 is deleted from path 13 is FIG. 6 and that relay mirror 16 shown in FIG. 1 at the end of path 17 is replaced in the embodiment of FIG. 6 by the phase corrector matrix 24'. Phase corrector matrix 24' is functionally the same as that described for the embodiment shown in FIG. 1 (details shown in FIG. 2) inasmuch as it responds to control signals from circuitry 36 to maximize the in-phase condition of the energy $\lambda_2$ at the target in a closed loop manner. It also maximizes the in-phase condition of the energy $\lambda_1$ at the target in an open loop manner. Since phase corrector matrix 24' must handle the energy from laser 10 as well as from laser 22, if the power of laser 10 is sufficiently high then phase corrector matrix 24' would be a cooled device. For example, mirror surface 40 (see FIGS. 2 and 3) could include arrangements for allowing coolant to be circulated through channels (not shown) on rear surfaces thereof.

In the embodiment of FIG. 6, it is assumed that the wavelengths $\lambda_1$ and $\lambda_2$ are sufficiently close to one another and/or the path length dispersion is sufficiently small that one high-power mirror can essentially correct at both wavelengths. The embodiment of FIG. 6 has the advantage that it saves a component, namely the low power corrector mirror (24 of FIG. 1). Also, since the phase corrector matrix which handles the high power is controlled in a closed loop manner there is a more positive type of control in the embodiment of FIG. 6.

The corrector mirror 24' should start (at zero correction voltage) from a "high-quality" figure position, for example, flat or parabolic. In this way corrections which include excess multiples of $2\pi$ radians phase shift can be avoided and, consequently, major discrepancies between phase shift at wavelengths $\lambda_1$ and $\lambda_2$ can be eliminated.

Still referring primarily to the embodiment of FIG. 6, a positionable mirror assembly 11 is disposed in path 13 between high power laser 10 and the diffraction grating 14. The function of this assembly which may be an electrically, or manually controllable microslewing or a microtilting mirror, for example, is to allow for changing the incidence angle of the high power beam by a small angle. This separates the output beams at wavelengths $\lambda_1$ and $\lambda_2$ by a corresponding angle. This offset beam feature allows forming the reference beam at wavelength $\lambda_2$ on a first selected target, for example, a point source target, while maintaining the high power beam at wavelength $\lambda_1$ on a second target. The positionable mirror assembly 11 is similarly implemented in the embodiments of FIGS. 1 and 7 so as to provide the offset beam feature.

Further, in the embodiment shown in FIG. 6, a filter 50 has been included between lens 30 and optical detector 32. Filter 50 has a passband which encompasses the bandwidth of the energy from laser 22 and functions to improve the signal to noise ratio of the adaptive subsystem by eliminating noise and signals outside of the selected passband. In particular it prevents "spillover" energy at wavelength $\lambda_1$ from degrading the operation of the adaptive subsystem.

Figure 7:
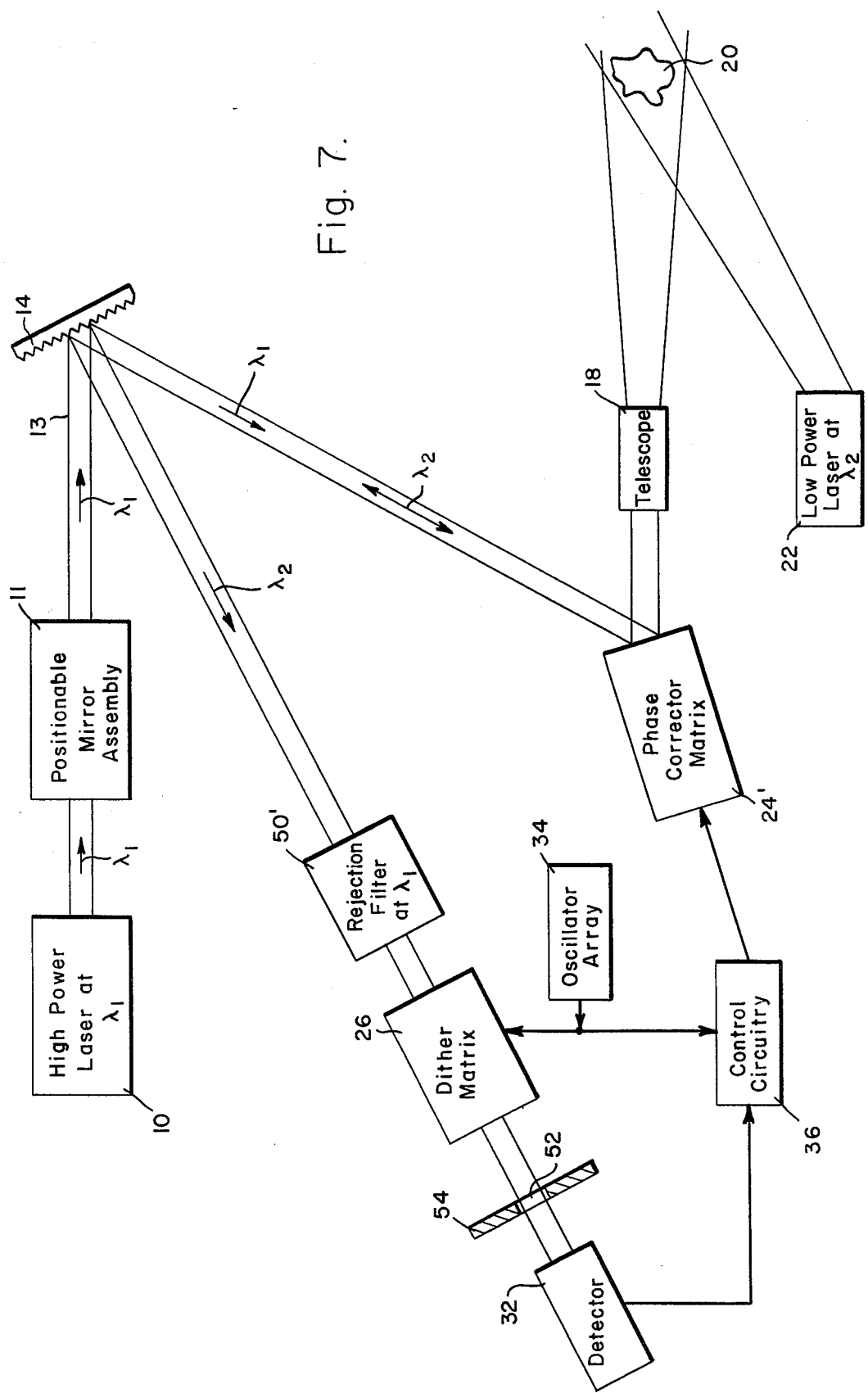
FIG. 7 is another embodiment of the subject invention wherein phase distortion in the propagation path is measured by means of a return-wave phase controlled adaptive array subsystem.

In the embodiment of FIG. 7, the high power laser beam at wavelength $\lambda_1$, is applied by means of diffraction grating 14, phase corrector matrix 24' and telescope 18 to target 20. A low power beam is applied from laser unit 22 to the target and in the embodiment of FIG. 7 the path from laser unit 22 to the target is not common with the transmission or reception path of the high power beam at wavelength $\lambda_1$. It is noted that in the embodiment of FIG. 7, laser unit 22 may be replaced by any suitable energy source. For example, in some applications energy from the sun, which is reflected from the target, is processed by the system of FIG. 7. Another example would be applications wherein the system of FIG. 7 responds to energy radiated from the target itself.

Some of the energy from the laser unit 22 which is reflected from target 20 is received by telescope 18 and is reflected from the phase corrector matrix 24'. This received energy is next reflected by the grating 14 to filter 50' which has a rejection bandwidth that encompass $\lambda_1$ of the energy from laser unit 10. The output signal from filter 50' is applied through dither matrix 26 and is passed by an aperture stop structure 54 to the optical detector unit 32. The output from detector 32 is processed by control circuitry 36 whose output signals control phase corrector matrix 24' in the same manner discussed hereinabove relative to the embodiment of FIG. 6. The dither matrix 26, the oscillator array 34 and the control circuit 36 shown in FIG. 7 may be the same as corresponding units previously discussed. However, in the embodiment of FIG. 7 the closed loop adaptive control is implemented by means of spatially modulating the return beam across the aperture 52 in accordance with the teachings of my U.S. Pat. No. 3,764,213. Briefly, by phase dithering the return beam within unit 26, the beam is spatially modulated across aperture 52 and phase unbalances across the beam result in amplitude modulation components in the output signal from detector 32. These modulation components are of the same frequency as the "tagging" frequency of the corresponding subaperture channel. It will be recalled that the tagging frequency is that frequency at which the phase shifter of unit 26 impresses phase modulation upon the energy passing through a given subaperture channel.

The control circuitry 36 responds to the amplitude modulation components from detector 32 so as to adjust the relative phase pattern across phase corrector matrix 24' to minimize the amplitude modulation components in the output signals from detector 32. This adjustment corrects for any phase distortions that the received beam encountered in the path between target 20 and the system. The same correction is applicable to the path from the system to target 20 and therefore the phase corrector matrix 24' also has the right setting for the high power energy being reflected therefrom. Hence, the high powered beam is substantially in phase at the target.

It is noted that all of the herein described embodiments are well suited to pulsed operation at the high-power wavelength $\lambda_1$. In this type of operation the $\lambda_2$ laser would be turned on in advance of the $\lambda_1$ pulse chain and therefore the corrector matrix will be set so that the high power laser pulse will initially be properly phased.

Normally the high power wavelength $\lambda_1$ and the lower power adaptive control wavelength $\lambda_2$ are chosen close together, for example, they may be differing transitions of a $CO_2$ laser, because a wide separation between the wavelengths complicates the construction of some of the system's components. For example, the diffraction-grating beam separation becomes harder to construct and the measuring wavefront must be sampled over a greatly expanded "sampling mesh" in order that potential ambiguity, for example, $2N\pi$ radian phase shifts, are avoided.

It is, however, possible to employ the systems of the subject invention with a visible illuminator (10$\mu$m) and a visible adaptive subsystem as the phase measuring means. One advantage of such a system is that it offers the potential for including an atmospherically compensated (active) visible imaging system as a low cost addition to the system. Further, as noted above in regard to the embodiment of FIG. 7 wherein the coherent optical adaptive subsystem operates on the return wave, in some applications a naturally present illuminating source, such as the sun, may be used in lieu of the low power $\lambda_2$ illumination laser. Such a system, of course, will only be operational during daylight operating condition and it would suffer from the drawbacks mentioned hereinabove relative to systems in which there is a wide separation between wavelengths $\lambda_1$ and $\lambda_2$.

Also, it is noted that since the laser source at $\lambda_2$ need not efficiently deliver its power to the target, a large modulation index may be implemented by dither matrix 26 so as to optimize the correction loop without concern for resultant parasitic modulations on the beam. Further, since power handling requirements are low the dither matrix may be implemented by means of acousto-optical or electrical-optical modulation techniques.

Thus having described new and useful dual-wavelength coherent optical adaptive systems, what is claimed is 1. An energy transmission system adapted for compensating for phase distortion in a propagation path to a target, said system comprising:
   means for producing a first energy beam of a first wavelength;
   means for directing said first energy beam along a first path to the target;
   adaptive subsystem means, responsive to energy at a second wavelength returned to the system from the target along a path substantially identical to at least the portion of said first path between the target and the system, for continuously mesuring the phase distortion in said return path and for producing control signals indicative of said measured values; and
   phase corrector matrix means disposed in the path of said first beam and responsive to said control signals for adjusting the relative phase across said first beam so as to compensate for the measured phase distortion;

whereby the energy across said first beam at the target is caused to approach an in-phase condition.

2. The energy transmission system of claim 1 wherein said adaptive subsystem means include means for transmitting and receiving a second energy beam at the second wavelength and means for phase modulating the transmitted beam and for responding to amplitude modulation components in the second beam received from the target at the second wavelength so as to produce said control signals indicative of phase distortion in the propagation path between the system and the target.

3. The energy transmission system of claim 1 wherein said adaptive subsystem means include means for spatially modulating the received energy so as to produce said control signals indicative of the phase distortion in the propagation path between the system and the target.

4. The energy transmission system of claim 1 in which said adaptive subsystem means transmits a second energy beam of said second wavelength and further comprising positionable mirror means for selectively varying the relative spatial positions of said first and second energy beams.

5. The energy transmission system of claim 1 wherein said adaptive subsystem means includes means for measuring the phase distortions from a beam of energy at said second wavelength which is adaptively formed on a small portion of the target having relatively high reflectivity.

6. The energy transmission system of claim 1 wherein said adaptive subsystem means includes means for measuring the phase distortion from a beam of energy at the second wavelength which is adaptively formed on a small portion of the target having relatively low reflectivity.

7. An energy transmission system adapted for compensating for phase distortions encountered in a propagation path to a remotely located target, said system comprising:

means for producing an energy beam of a first wavelength for transmission to said target;

adaptive subsystem means for transmitting an energy beam of a second wavelength and for receiving energy at said second wavelength and including means for phase modulating said transmitted beam of the second wavelength and for responding to modulation components in the energy received from the target at said second wavelength so as to produce control signals indicative of the phase distortions in the propagation path between the system and the target;

a diffraction-grating beam separator disposed so as to receive the transmission beams at said first and second wavelengths, said separator operating to direct said beams along substantially identical paths to the target and to direct received energy reflected from the target to said adaptive subsystem means; and phase corrector matrix means disposed in the path between said means for producing an energy beam of a first wavelength and said diffraction-grating beam separator, and responsive to said control signals for adjusting the relative phase across said energy beam of said first wavelength so as to compensate for said phase distortions.

8. The energy transmission system of claim 7 further comprising a positionable mirror assembly disposed between said means for producing an energy beam of a first wavelength and said diffraction-grating beam separator, said assembly allowing for the spatial positioning of said energy beam of said first wavelength.

9. The energy transmission system of claim 7 further comprising positionable mirror means for selectively varying the relative spatial positions of the beams at said first and second wavelengths.

10. An energy transmission system adapted for compensating for phase distortions encountered in a propagation path to a target, said system comprising:

means for producing a first energy beam of a first wavelength;

adaptive subsystem means for transmitting a beam of energy at a second wavelength and for receiving energy at said second wavelength, said subsystem including means for phase modulating the transmitted beam and for responding to amplitude modulation components in the energy received from the target at the second wavelength so as to produce control signals indicative of the phase distortion in the propagation path between the system and the target;

a diffraction-grating beam separator disposed so as to direct a transmission beam at said first and second wavelengths along substantially identical paths to the target and for directing received energy, reflected from the target, to said adaptive subsystem means; and said adaptive subsystem means including a phase corrector matrix disposed in the path of the transmission beam at the first and second wavelengths and responsive to said control signals for adjusting the relative phase across said beam so as to compensate for the measured phase distortions.

11. The energy transmission system of claim 10 further comprising positionable mirror means for selectively varying the relative spatial positions of the transmitted beams at said first and second wavelengths.

12. An energy transmission system which is adapted for compensating for phase distortions encountered in a propagation path to a target that reflects and/or radiates energy at a first wavelength, said system comprising:

means for producing an energy beam of a second wavelength;

adaptive subsystem means for receiving an energy beam at the first wavelength and for spatially modulating said received energy to produce control signals indicative of the phase distortions in the propagation path;

a diffraction-grating beam separator disposed to direct the transmission beam along a path to said target which is substantially identical with the path of the received energy beam applied to said adaptive subsystem means; and said adaptive subsystem means including a phase control matrix disposed so as to receive both beams and being responsive to said control signals for adjusting the relative phase across both beams so as to substantially compensate for said measured phase distortion.

13. The energy transmission system of claim 12 further comprising means for illuminating said target with an energy beam at the first wavelength.

14. The energy transmission system of claim 12 further comprising a positionable mirror assembly disposed between said means for producing the energy beam at the second wavelength and said diffraction grating beam separator for allowing the energy beam at the second wavelength to be spatially positioned.

15. The energy transmission system of claim 12 further comprising positionable mirror means for selectively varying the relative spatial positions of the beams at said first and second wavelengths.

* * * * *